No. 648,574. Patented May 1, 1900.
J. P. PITTMAN.
CHEESE CUTTING GAGE.
(Application filed Jan. 5, 1900.)
(No Model.)
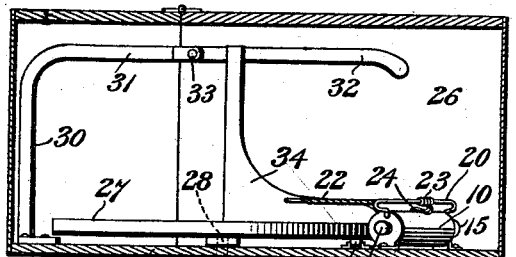
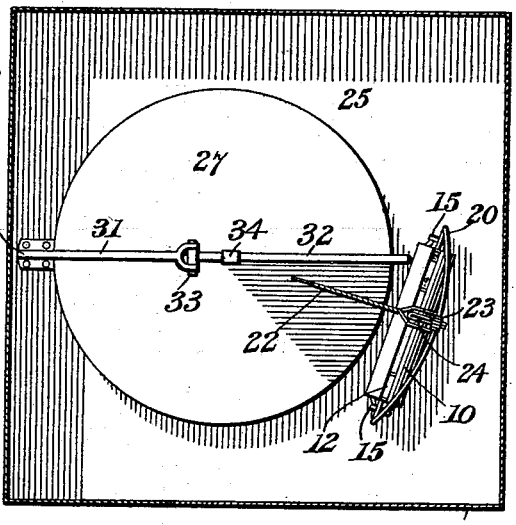
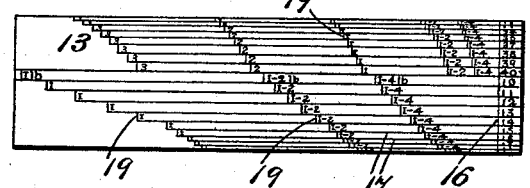
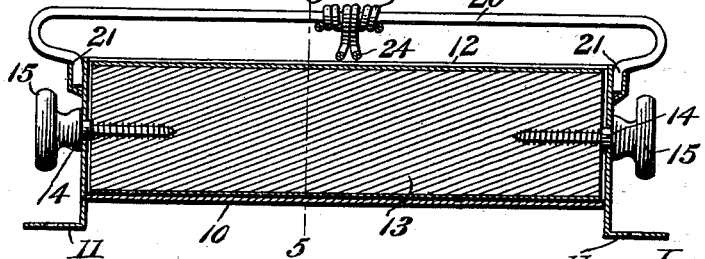
By James P. Pittman Inventor
Attorney

UNITED STATES PATENT OFFICE.

JAMES PINKNEY PITTMAN, OF BEAUMONT, TEXAS.

CHEESE-CUTTING GAGE.

SPECIFICATION forming part of Letters Patent No. 648,574, dated May 1, 1900.

Application filed January 5, 1900. Serial No. 474. (No model.)

*To all whom it may concern:*

Be it known that I, JAMES PINKNEY PITTMAN, a citizen of the United States, residing at Beaumont, in the county of Jefferson and State of Texas, have invented a new and useful Cheese-Cutting Gage, of which the following is a specification.

My invention relates to improvements in indicators or gages for cutting articles in bulk, such as whole cheese; and the object in view is to provide a simple and cheap contrivance for use in coöperative relation to a movable table and including a shiftable element adapted to be placed at variable positions for indicating accurately the line of cut according to the desired weight of the fragment, the parts being so combined that cakes of cheese varying in weight may be cut in sections, each of a single piece, accurately according to the weight desired, from one-half pound upward to one, two, or more pounds.

With these ends in view the invention consists in the novel combination of devices and in the construction and arrangement of parts, as will be hereinafter fully described and claimed.

To enable others to understand the invention, I have illustrated a preferred embodiment thereof in the accompanying drawings, forming a part of this specification, and in which—

Figure 1 is a sectional elevation of a cheese-cutter with my improved gage or indicator in operative relation to a movable table and the plane of action of the cutter-knife. Fig. 2 is a plan view of the working parts, showing the cheese-casing in horizontal section. Fig. 3 is a detail perspective view of the gage or indicator removed from the casing for the cutter mechanism. Fig. 4 is a longitudinal sectional view through the indicator or gage casing. Fig. 5 is a transverse section in the plane of the dotted line 5 5 of Fig. 4. Fig. 6 is a detail plan view of the indicator-cylinder removed from the casing and other parts of the indicator.

The same numerals of reference are used to indicate like and corresponding parts in each of the several figures of the drawings.

The indicator or gage of my invention is especially designed for use in operative relation to a movable table and a cutter mechanism of a cheese-cutting machine, one type of which is shown by the drawings and will be hereinafter described. The revoluble cylinder of this indicator is housed or contained in a casing 10, preferably of cylindrical form and having the depending feet 11 at its ends, said feet adapted to be fastened firmly to the bottom of the casing which contains the cutting mechanism and serves as an inclosure for the cheese. This casing for the indicator-cylinder is provided in its upper side with a longitudinal observation-slot 12, through which the operator may observe the indications on the revoluble cylinder 13 for the purpose of adjusting the shiftable indicator element to variable positions to indicate the lines of cut on the cheese or other article, whereby the cheese may be cut in fragments accurately according to weight. This revoluble cylinder is provided at its ends with journals 14, which are properly supported in openings or bearings of the heads, forming parts of the casing 10, and to the protruding or exposed ends of the cylinder-journals are securely fastened the knobs 15, adapted to be grasped by hand and to be turned for the purpose of rotating the cylinder on its axis and bringing different graduations thereof into view through the slot 12 in the casing. This indicator-cylinder is inscribed with divisions, figures, and indicating lines or marks for use in connection with cakes of cheese which vary in weight, whereby it is adapted to serve, in connection with a shiftable indicator element, for the purpose of accurately noting the line of cut. At one end the surface of the cylinder is inscribed with a circle 16, and the cylinder is furthermore inscribed with a plurality of longitudinal parallel lines 17, the latter intersecting the circle 16 and forming an annular series of rectangular spaces 18, adapted to receive numerals arranged consecutively according to the different weights of the cheese—as, for instance, from ten to forty pounds. Between the longitudinal lines are other indications 19, which are placed at variable distances to indicate a fragment of the weight denoted by the numeral in the space 18—as, for instance, from one-half of a pound upward to two or more pounds. It is to be understood that the cylinder may be turned on its axis by the manipulation of one of its knobs to bring either of the spaces 18 and the longitudinal series of subdivisions corresponding thereto into view through the observation-slot.

One of the important features of my invention consists in the provision of an arcuate or segmental guide 20, which is fastened to the indicator-casing 10, adjacent to the observation-slot therein, and which is adapted when the gage or indicator is properly fixed within the cheese-casing to lie concentric with the axis of the cheese on a revoluble table. In the embodiment of the invention shown by the drawings this guide is represented as consisting of a curved piece of wire having its ends bent or curved into the legs 21, which are fastened to the opposite ends of the cylinder, adjacent to the terminals of the slot 12 therein. On this segmental guide is slidably fitted the shiftable indicator element, which is embodied in the form of an indicator-arm 22, having an eye 23 and a finger 24. This shiftable element is shown as bent from a single piece of wire, having the eye 23 formed by coiling the wire in a manner to connect the arm 22 with the finger 24; but this detailed construction and the material employed may be varied by a skilled constructor. The arm 22 is considerably longer than the finger 24, and this finger extends downwardly from the arm in a curved or inclined direction, as shown by Fig. 5. This construction of the shiftable element provides for the extension of the long arm a proper distance beyond the gage, so as to overhang the movable table of the cutter appliance, while the finger extends from the guide, so as to rest upon the indicator-casing, across the observation-slot therein, whereby the finger is adapted to traverse the casing opposite to the division in the indicator-cylinder, which enables the operator to accurately determine the position of the shiftable indicator element.

In Figs. 1 and 2 of the drawings I have illustrated one type of the cheese-cutter appliance with which my improved indicator or gage is adapted for use. The cheese and the cutter mechanism are intended to be contained or housed within a casing of any suitable material and dimensions, said casing having an imperforate bottom 25 and a hinged front 26. A revoluble table 27 is arranged within this casing in a position slightly raised above the bottom 25 thereof, said table being supported for free rotation by a central pintle 28 and a roller 29, the latter being arranged on the bottom near the front edge of the table in order to sustain the thrust of the knife in the operation of cutting the cheese. An angular knife-bracket 30 is fastened firmly to the bottom 25 at the rear side of the casing, said knife-bracket being provided with an overhanging arm 31, arranged above the revoluble table and the load thereon. A knife-operating handle 32 is pivotally connected at 33 to the overhanging arm of the knife-bracket, said arm being movable in a vertical plane on the horizontal axis afforded by the pivot 33. A knife or cutter 34 of right-angular form and construction is securely fastened at its upper end to the pivoted arm 32 at a point on one side of its pivotal connection with the knife-bracket.

It is to be observed that the pivotal arm and the knife carried thereby are supported by the knife-bracket in an overhanging position relative to the revoluble table and adapted to cut the cheese on lines radial to the axis thereof according to the presentation of the cheese by rotation of the table to the cutter mechanism. The indicator or gage of my invention is fastened firmly to the bottom 25 in any approved way for the indicator-cylinder 13 to have its annular series of graduations 18 intersect a continuation of the cutting plane of the knife, forming an element of the cutter mechanism. This disposition of the indicator brings the casing thereof close to the edge of the revoluble table, whereby the guide 20 is arranged concentric with the axis of the table, and the shiftable indicator element is adapted to overhang the table, so as to lie in the path of the load thereon. The weight of the cheese having been ascertained the cylinder 13 is rotated until the figure in the space 18 corresponding to the weight of the cheese is brought into view through the slot 12.

The whole cheese is placed on the revolving table, and to cut a fragment from the cheese in a single piece and of a predetermined weight—say, for example, one pound—the shiftable indicator element is turned back on the rod and moved lengthwise along the same until its finger reaches the proper indication in the longitudinal space of the cylinder, the long arm 22 being turned away from the whole cheese. The operator now depresses the knife through the cheese to make a cut on a line radial to the axis thereof, after which the knife is lifted free from the cheese, the table is turned until the first radial incision is opposite to the position assumed by the long arm of the shiftable indicator element, and then a second cut is made in the whole cheese, the knife again lifted, and the piece or fragment is removed. After this initial fragment has been taken out of the cheese the shiftable element is turned back to its normal position, so as to overhang the table. In the continued use of the apparatus the indicator element is moved along the rod to variable positions over the scale and with the long arm thereof extending over the table. The adjustment of the table and the cheese thereon brings one face of the cut cheese against the long arm of the indicator element and positions the cheese below the plane of operation of the cutter or knife, so as to sever fragments each in a single piece and at a predetermined weight. In like manner different sizes and weights of fragments may be cut from the cake varying from one-half of a pound up to two or more pounds. It is to be understood that when another cake of cheese of a different weight is placed on the table the cylinder is to be turned or rotated in order to bring the proper weight indication and the line of subdivision corresponding thereto into view through the observation-slot.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described the invention, what I claim is—

1. The combination with a revoluble table, of a graduated indicator adjacent thereto, an arcuate guide concentric with the axis of rotation of said table, and a shiftable element movably confined by the guide and having two members arranged to overhang the table and to traverse said graduated indicator, respectively, substantially as described.

2. The combination with a revoluble table, of a stationary guide, a shiftable element slidably fitted to said guide for movement in a path concentric with the axis of the table and having a member arranged to overhang said table, and a graduated indicator-cylinder revoluble on its axis independently of the shiftable element and arranged contiguous thereto for the latter to traverse said cylinder.

3. The combination of a casing, a revoluble cylinder journaled in said casing and graduated substantially as described, a guide fixed to the casing, and a shiftable element slidably confined in the guide and having an elongated arm and a finger, the latter adapted to traverse the casing and the graduations on the indicator-cylinder, as and for the purposes set forth.

4. The combination of a casing having suitable attaching means and an observation-slot, a revoluble indicator element provided with graduations and journaled in said casing, an arcuate guide fastened to the casing, and a shiftable element slidably fitted on the guide and having an arm and a finger, the latter adapted to traverse the casing and the graduations of the revoluble indicator element, as and for the purposes described.

In testimony that I claim the foregoing as my own I have hereto affixed my signature in the presence of two witnesses.

JAMES PINKNEY PITTMAN.

Witnesses:
 REUBEN L. DICKINSON,
 URIAH O. LONG.